Jan. 3, 1928. 1,655,338
W. J. ROE
MOTOR
Filed Jan. 15, 1927 2 Sheets-Sheet 1
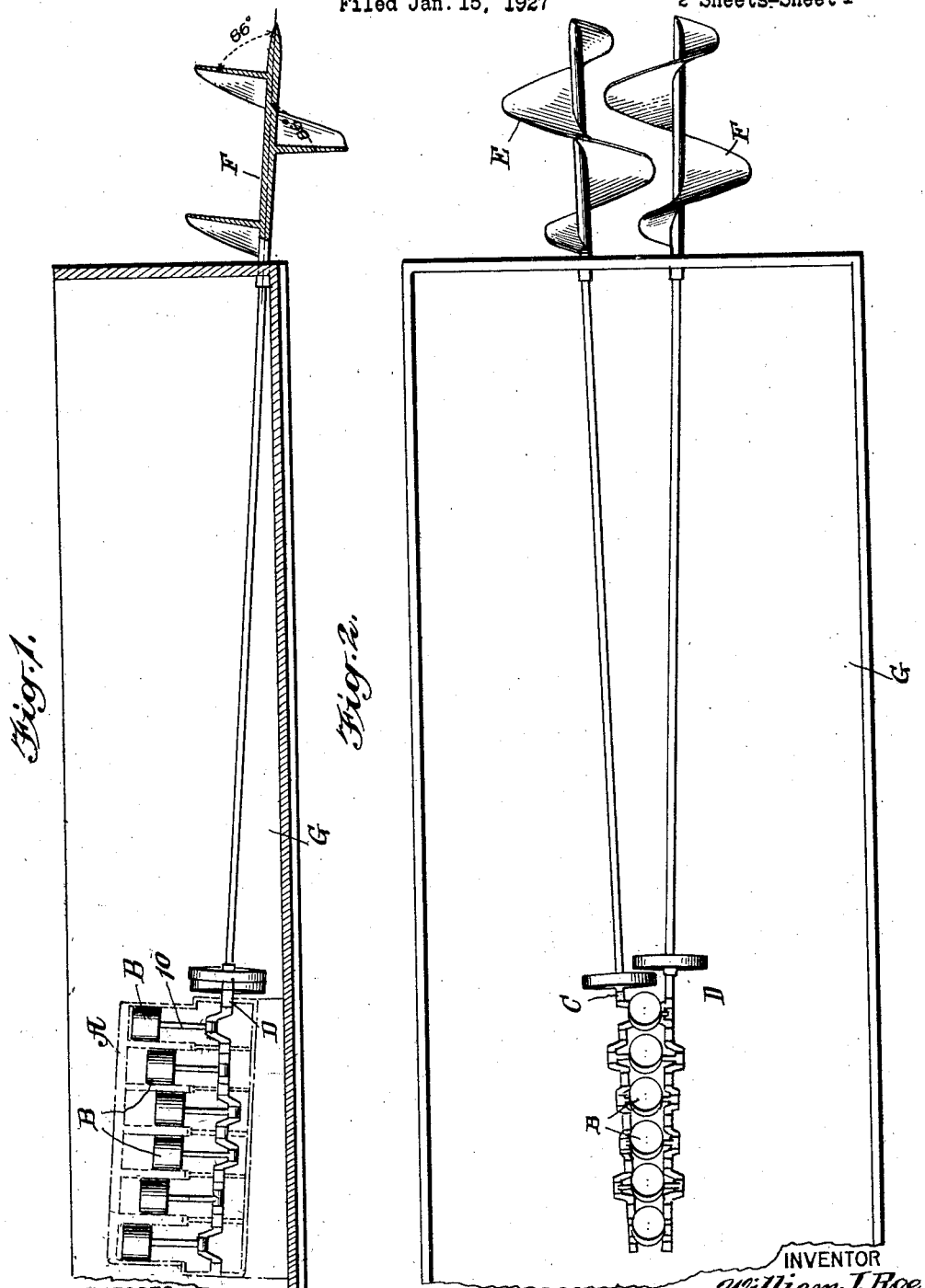
WITNESSES
INVENTOR
William J. Roe
BY
ATTORNEY Jan. 3, 1928.

W. J. ROE 1,655,338

MOTOR

Filed Jan. 15, 1927

WITNESSES

INVENTOR
William J. Roe
BY
ATTORNEY

Patented Jan. 3, 1928.

1,655,338

UNITED STATES PATENT OFFICE.

WILLIAM JAMES ROE, OF NEWBURGH, NEW YORK.

MOTOR.

Application filed January 15, 1927. Serial No. 161,456.

This invention relates to reciprocatory piston motors and comprehends a double crank motor in which the crank shafts diverge relatively and are driven in opposite directions by the reciprocation of the piston or pistons.

The outstanding object of the present invention is to provide an improved connection between the crank shafts and each piston which will compensate for relative fore-and-aft rocking motion and lateral motion of the piston rods or connecting rods to eliminate undue friction caused by thrusts by the pistons on the walls of the cylinders.

More specifically the invention comprehends a wrist pin construction and mounting for diverging double crank shaft reciprocating piston motors, which mounting allows for a relative fore-and-aft and lateral rocking motion or movement of the wrist pins with respect to the piston.

Other objects of the invention reside in the simplicity of the connection between the crank shafts and the piston, the economy with which the same may be manufactured, assembled or disassembled for repair or replacement of broken parts, and the general efficiency derived therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a diagrammatic side view of a motor constructed in accordance with the invention and illustrating its principal application as a marine engine;

Fig. 2 is a plan view of the motor with the cylinders removed;

Figure 3:
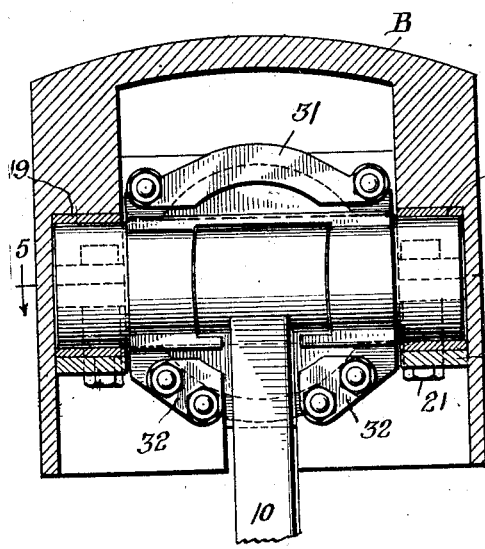
Fig. 3 is a longitudinal or fore-and-aft sectional view through one of the pistons taken approximately on the line 3—3 of Fig. 5.
Figure 4:
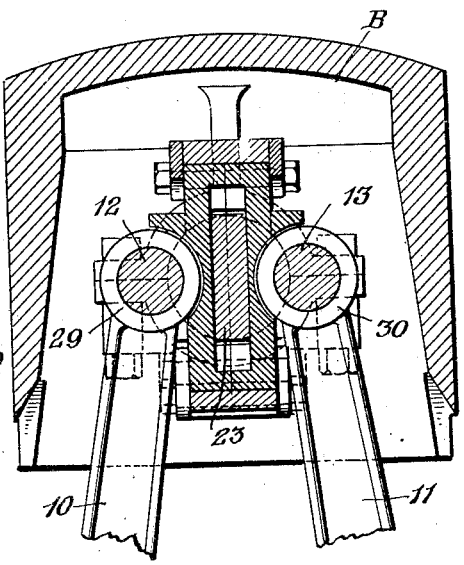
Fig. 4 is a transverse sectional view therethrough.
Figure 5:
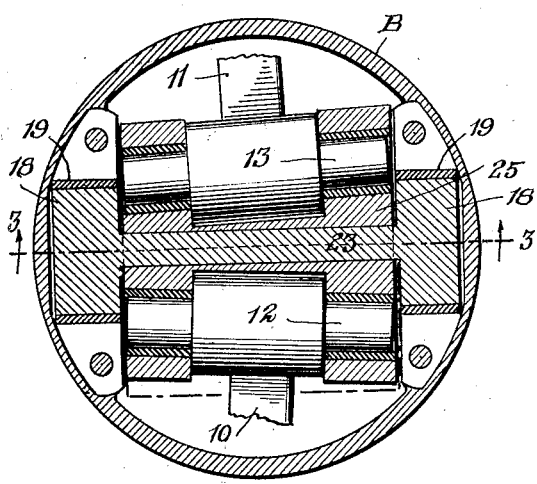
Fig. 5 is a horizontal sectional view taken approximately on the line 5—5 of Fig. 3.
Figure 6:
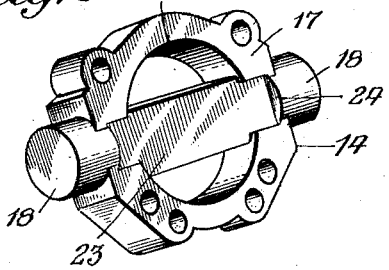
Fig. 6 is a perspective view of the intermediate element of the wrist pin mounting.
Figure 7:
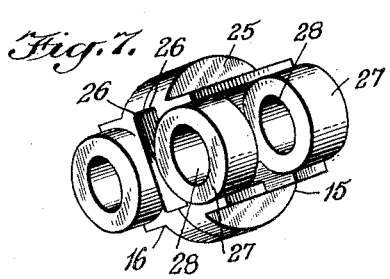
Fig. 7 is a perspective view of the outer elements of the wrist pin mounting in juxtaposition and in its disassembled relation to the inner element thereof.

Referring to the drawings by characters of reference A designates in dotted lines in Fig. 1, a cylinder block which may include one or more cylinders within which pistons B are adapted to reciprocate preferably by internal combustion. A pair of crank shafts C and D which are mounted in bearings to diverge are adapted to be connected with each piston to be driven in opposite directions thereby. In its principal application the engine or motor is designed for marine use for driving and rotating spiral screw propellers E and F in opposite directions to counteract any tendency of the boat or other craft G to be driven off of a true course or in a straight line. It is to be understood, however, that the motor may be employed for other purposes without in any way departing from the scope of the invention. The means for connecting the pistons respectively to each of the crank shafts C and D includes a pair of piston rods or connecting rods 10 and 11 and the invention is chiefly concerned with the mounting for the wrist pins 12 and 13 which connect the piston rods with the piston B. This mounting consists of an intermediate element characterized generally by the reference character 14 and a pair of outer elements characterized generally by the reference characters 15 and 16. The intermediate element 15 includes a body 17 formed at its opposite ends with trunnions 18—18, which are journaled in bearings 19—19 provided at diametrically opposite points within the piston B, the said bearings being of any desired type, and, as illustrated, being formed with removable sections 20, which are secured in place by bolts 21 or any other suitable fastening devices. This construction and arrangement allows for what will be termed a "lateral rocking movement" of the wrist pin mounting relative to the piston B. The body 17 of the intermediate element is formed with a transverse circular opening 22 and a bridge piece 23 extends across the opening, the said bridge piece being of less thickness than the thickness of the body 17 and disposed intermediate the width of the body. The body 17 is in turn of less width than the diameter of the trunnions 18 so that shoulders 24 are formed at the inner end of the trunnions. The outer elements 15 and 16 are of identical formation and each includes a substantially circular body 25, the inner confronting faces of which are formed with transverse grooves or recesses 26 of a size to snugly fit around the bridge piece 23 with the circular body portions 25 disposed within the opening 22 of the body 17 of the intermediate element. The outer side faces of the bodies 25 of the outer elements 15 and 16 are provided with a pair of spaced wrist pin knuckles 27—27 having alined bores or apertures 28 for the reception of the wrist pins 12 and 13, when the bearing knuckles 29 and 30 of the piston rods 10 and 11 are positioned between the knuckles 27—27.

It will be noted that the knuckles 27 and their bores 28 have their axes disposed at an angle to the axis of the intermediate element and its trunnions 18 so that the pivotal axes of the point of connection of the piston rods 10 and 11 with the piston, diverge coincident to the divergence of the crank shafts C and D of the motor. It will also be noted that the outer ends of the knuckles 27 when the outer elements are assembled with the intermediate element, are disposed inside of and in substantially abutting relation to the shoulders 24, with said shoulders partially protruding over the bars 28, thereby retaining the wrist pins in place.

In order to retain the outer elements 15 and 16 in assembled relation with the intermediate element 14, an upper substantially arcuate plate 31 is bolted or otherwise secured to the opposite side faces of the upper portion of the body 17 of the intermediate element 14 so that a portion of the plate protrudes over or beyond the periphery of the opening 22. A pair of retaining plates 32 are bolted or otherwise secured to the opposite side faces of the lower portion of the intermediate member to protrude beyond the periphery of the opening 22, so as to lie in front and rear of the piston rods 10 and 11. Under this construction and arrangement it is obvious that the entire wrist pin mounting including the intermediate and outer elements 14, 15 and 16, together with wrist pins, may rock laterally with respect to the piston D while the outer elements 15 and 16 which carry the wrist pin bearing knuckles are mounted in such a manner as to allow for a forward or rearward rocking movement at a right angle to the lateral rocking movement.

This construction and arrangement in addition to compensating for the relative movements between the piston and the piston rods or connecting rods of a motor having a double oppositely driven pair of crank shafts which diverge, also serves to eliminate thrust of the piston on the walls of the cylinder; to reduce friction; to economize in the quantity of lubricating oil necessary to the operation of the motor, and to minimize vibration.

It will be further noted that due to the construction set forth, the economy and rapidity with which the elements may be disassembled and assembled when repairs or renewal of parts is necessary, renders the invention thoroughly practical and commercially advantageous.

It will also be found that in practice a motor constructed in accordance with the invention will drive the two crank shafts in opposite directions at practically the same rate of speed which renders the same particularly applicable for marine and aeronautical use where it is desirable to drive two propelling devices.

What is claimed is:

1. In a reciprocatory piston motor, a pair of diverging crank shafts, a pair of piston rods respectively connected with the crank shafts, and a connection between said pair of piston rods and the piston for driving the crank shafts in opposite directions.

2. In a reciprocatory piston motor, a pair of diverging crank shafts, a pair of piston rods respectively connected with the crank shafts, and a connection between said pair of piston rods and the piston for driving the crank shafts in opposite directions and at the same rate of speed.

3. In a reciprocatory piston motor, a pair of diverging crank shafts, a pair of piston rods respectively connected with the crank shafts, and a connection between said pair of piston rods and the piston for driving the crank shafts in opposite directions and at the same rate of speed, said connection including means for compensating for the lateral and forward and rearward relative rocking motion between the piston and piston rods.

4. In a reciprocatory piston motor, a pair of diverging crank shafts, a pair of piston rods respectively connected with the crank shafts, and a connection between said pair of piston rods and the piston for driving the crank shafts in opposite directions and at the same rate of speed, said connection comprising an intermediate element and a pair of outer elements, said outer elements having wrist pin bearing knuckles.

5. In a reciprocatory piston motor, a pair of diverging crank shafts, a pair of piston rods respectively connected with the crank shafts, and a connection between said pair of piston rods and the piston for driving the crank shafts in opposite directions and at the same rate of speed, said connection comprising an intermediate element and a pair of outer elements, said outer elements having wrist pin bearing knuckles, and the intermediate element having forward and rearwardly projecting trunnions journaled at diametrically opposite points within the piston to permit of relative lateral rocking movement of the connection.

6. In a reciprocatory piston motor, a pair of diverging crank shafts, a pair of piston rods respectively connected with the crank shafts, and a connection between said pair of piston rods and the piston for driving the crank shafts in opposite directions and at the same rate of speed, said connection comprising an intermediate element and a pair of outer elements, said outer elements having wrist pin bearing knuckles and the intermediate element having forward and rearwardly projecting trunnions journaled at diametrically opposite points within the piston to permit of relative lateral rocking movement of the connection, and the outer elements being mounted for independent relative forward and rearward rocking motion with respect to the intermediate element.

7. In a reciprocatory piston motor, a pair of diverging crank shafts, a pair of piston rods respectively connected with the crank shafts, and a connection between said pair of piston rods and the piston for driving the crank shafts in opposite directions and at the same rate of speed, said connection comprising an intermediate element and a pair of outer elements, said outer elements having wrist pin bearing knuckles and the intermediate element having forward and rearwardly projecting trunnions journaled at diametrically opposite points within the piston to permit of relative lateral rocking movement of the connection, and the outer elements being mounted for independent relative forward and rearward limited rocking motion with respect to the intermediate element.

8. In a reciprocatory piston motor, a pair of diverging crank shafts, a pair of piston rods respectively connected with the crank shafts, and a connection between said pairs of piston rods and the piston for driving the crank shafts in opposite directions and at the same rate of speed, said connection comprising an intermediate element and a pair of outer elements, said outer elements having wrist pin bearing knuckles, the axes of which are disposed at an angle to the axis of the intermediate element.

9. In a reciprocatory piston motor, a pair of diverging crank shafts, a pair of piston rods respectively connected with the crank shafts, and a connection between said pairs of piston rods and the piston for driving the crank shafts in opposite directions and at the same rate of speed, said connection comprising an intermediate element and a pair of outer elements, said outer elements having wrist pin bearing knuckles, the axes of which are disposed at an angle to the axis of the intermediate element, whereby the wrist pins diverge coincident to the divergence of the motor crank shafts.

WILLIAM JAMES ROE.